US012444558B2

(12) United States Patent
Porter et al.

(10) Patent No.: US 12,444,558 B2
(45) Date of Patent: Oct. 14, 2025

(54) SYSTEM AND METHOD FOR POINT ON WAVE CLOSING OF A VACUUM INTERRUPTER

(71) Applicant: S&C Electric Company, Chicago, IL (US)

(72) Inventors: David G. Porter, East Troy, WI (US); Thomas S. Kelley, Highland Park, IL (US); Joseph W. Milton, Milwaukee, WI (US); Andrew B. Berman, Racine, WI (US)

(73) Assignee: S&C Electric Company, Chicago, IL (US)

( * ) Notice: Subject to any disclaimer, the term of this patent is extended or adjusted under 35 U.S.C. 154(b) by 0 days.

(21) Appl. No.: 18/483,133

(22) Filed: Oct. 9, 2023

(65) Prior Publication Data

US 2024/0153725 A1 May 9, 2024

Related U.S. Application Data

(60) Provisional application No. 63/423,518, filed on Nov. 8, 2022.

(51) Int. Cl.

*H01H 33/59* (2006.01)
*H01H 9/56* (2006.01)
*H01H 33/666* (2006.01)

(52) U.S. Cl.

CPC ............ *H01H 33/593* (2013.01); *H01H 9/56* (2013.01); *H01H 33/6662* (2013.01); *H01H 2009/566* (2013.01); *H01H 2033/6668* (2013.01)

(58) Field of Classification Search

CPC ............... H01H 9/56; H01H 2009/566; H01H 11/0062; H01H 33/593; H01H 33/6662; G01R 31/3274

See application file for complete search history.

(56) References Cited

U.S. PATENT DOCUMENTS

2015/0098164 A1* 4/2015 Lenig ...................... H01H 9/56 361/185

FOREIGN PATENT DOCUMENTS

EP 575792 A1 * 12/1993 ............... H01H 9/56

OTHER PUBLICATIONS

Yu, Li, et al. "An approach for minimum percussion welding in closing operation of a 126-kV vacuum circuit breaker." IEEE transactions on components, packaging and manufacturing technology 4.5 (2014): 840-847. (Year: 2014).*

Lammers, A. J. W., P. P. Leeufkens, and G. C. Schoonenberg. "MV vacuum switchgear based on magnetic actuators." (1998): 86-90. (Year: 1998).*

(Continued)

*Primary Examiner* — Ryan Johnson

(57) ABSTRACT

A system and method for point on wave closing of a switching device, where the close initiation point is selected so that a minor current loop is generated that minimizes the accumulated current during the closing operation. The method includes determining bounce characteristic of contacts in the switching device during the closing operation, identifying available close initiation points on a voltage wave for a voltage across the contacts, selecting one or two of the close initiation points on the voltage wave that minimizes the accumulation of current during the closing operation, and closing the switching device using the selected close initiation point.

11 Claims, 3 Drawing Sheets

(56) References Cited

OTHER PUBLICATIONS

Slade, Paul G. “The contact force to prevent large area, closed, vacuum interrupter contacts from welding when passing high fault currents of up to 4 seconds duration.” 2015 IEEE 61st Holm Conference on Electrical Contacts (Holm). IEEE, 2015. (Year: 2015).*

* cited by examiner

SYSTEM AND METHOD FOR POINT ON WAVE CLOSING OF A VACUUM INTERRUPTER

CROSS-REFERENCE TO RELATED APPLICATION

This application claims the benefit of priority from the U.S. Provisional Application No. 63/423,518, filed on Nov. 8, 2022, the disclosure of which is hereby expressly incorporated herein by reference for all purposes.

BACKGROUND

Field

This disclosure relates generally to a system and method for point on wave closing of a vacuum interrupter, and, more particularly, to a system and method for adjusting the point on wave closing of a vacuum interrupter, where the close initiation point is selected so that a minor current loop is generated that minimizes accumulated current during the closing operation.

Discussion of the Related Art

An electrical power distribution network, often referred to as an electrical grid, typically includes power generation plants each having power generators, such as gas turbines, nuclear reactors, coal-fired generators, hydro-electric dams, etc. The power plants provide power at a variety of medium voltages that are then stepped up by transformers to a high voltage AC signal to be connected to high voltage transmission lines that deliver electrical power to substations typically located within a community, where the voltage is stepped down to a medium voltage for distribution. The substations provide the medium voltage power to three-phase feeders including three single-phase feeder lines that carry the same current but are 120° apart in phase. Three-phase and single phase lateral lines are tapped off of the feeder that provide the medium voltage to various distribution transformers, where the voltage is stepped down to a low voltage and is provided to loads, such as homes, businesses, etc.

Transient faults occur in the distribution network from such things as animals touching the lines, lightning strikes, tree branches falling on the lines, vehicle collisions with utility poles, etc. Faults may create a short-circuit that increases the stress on the network, which may cause the current flow to significantly increase, for example, many times above the normal current, along the fault path. This amount of current causes the electrical lines to significantly heat up and possibly melt, and also could cause mechanical damage to various components in the network. These faults are often transient or intermittent faults as opposed to a persistent or bolted fault, where the thing that caused the fault is removed a short time after the fault occurs, for example, a lightning strike. In such cases, the distribution network will almost immediately begin operating normally after a brief disconnection from the source of power.

Some power distribution networks may employ underground single-phase lateral circuits that feed residential and commercial customers. Often times these circuits are configured in a loop and fed from power sources at both ends, where an open circuit location in the loop isolates the two power sources. Transformers are provided along the loop that each service loads, where the open circuit location is typically provided at one of the transformers. A single-phase line is coupled to the primary coil in each transformer so that current flows to the primary coils along the loop. It has been proposed in the art to provide a switching device at the source side and the load side of each transformer between the primary coil and the line. The two switching devices in each transformer can be controlled by a common control unit that provides fault isolation and power restoration in response to a fault in the line.

These, and other types of switching devices, often employ a vacuum interrupter and a magnetic actuator that operates the vacuum interrupter. A vacuum interrupter is a switch that employs opposing contacts, one fixed and one movable, positioned within a vacuum enclosure. When the vacuum interrupter is opened by operating the magnetic actuator to move the movable contact away from the fixed contact to prevent current flow through the interrupter a plasma arc is created between the contacts that is contained and quickly extinguished by the vacuum at the next zero current crossing.

The magnetic actuator used in these types of switching devices typically have an armature or plunger that is moved by an electrical winding wound on a stator to open and close the vacuum interrupter contacts, where the plunger and the stator provide a magnetic path for the magnetic flux produced by the winding, and where the plunger is connected through a preloaded compliance spring to the movable contact by a drive rod. In one design, when the actuator is controlled to close the vacuum interrupter, the winding is energized by current flow in one direction, which causes the plunger to move and seat against a latching plate. The current is then turned off to de-energize the coil and permanent magnets hold the plunger against the latching plate and against a compression force of an opening spring and the compliance spring. When the actuator is controlled to open the vacuum interrupter, the winding is energized by current flow in the opposite direction, which breaks the latching force of the permanent magnets and allows the opening spring to open the vacuum interrupter. The compliance spring is provided in addition to the opening spring to provide an additional opening force at the beginning of the opening process so as to break the weld on the interrupter contacts.

There are various scenarios where the switching device might be commanded closed when high fault current is present. When that occurs there is arcing across the contacts in the vacuum interrupter when the movable contact is close enough to the fixed contact because of the high voltage potential across the contacts. The movable contact then engages the fixed contact and since this occurs at high closing speeds, the movable contact usually bounces off of the fixed contact, where the bounce may occur once or twice before the movable contact fully engages the fixed contact. The bounce causes additional arcing between the contacts. Each time the arcing occurs at these high currents, the contacts may become damaged. Some of these scenarios require that the closing operation be performed more than once, which may cause the contacts to weld together because of the additional arcing. The welded contacts may need to be opened by a manual opening operation of the switching device.

SUMMARY

The following discussion discloses and describes a system and method for adjusting the point on wave closing of a switching device to reduce contact arcing damage, where the close initiation point is selected so that a minor current loop is generated that minimizes the accumulated current on open contacts during the closing operation. The method includes determining bounce characteristic of contacts in the switching device during the closing operation, identifying available close initiation points on a voltage wave for a voltage across the contacts, selecting one or two of the close initiation points on the voltage wave that minimizes the accumulation of current during the closing operation, and closing the switching device using the selected close initiation point.

Additional features of the disclosure will become apparent from the following description and appended claims, taken in conjunction with the accompanying drawings.

DETAILED DESCRIPTION OF THE EMBODIMENTS

The following discussion of the embodiments of the disclosure directed to a system and method for adjusting the point on wave closing of a vacuum interrupter to reduce contact arcing damage, where the close initiation point is selected so that a minor current loop is generated that minimizes the accumulated current during the closing operation, is merely exemplary in nature, and is in no way intended to limit the disclosure or its applications or uses. For example, the system and method have particular application for use in a switching device associated with transformers in a residential loop circuit. However, the system and method may have other applications.

Figure 1:
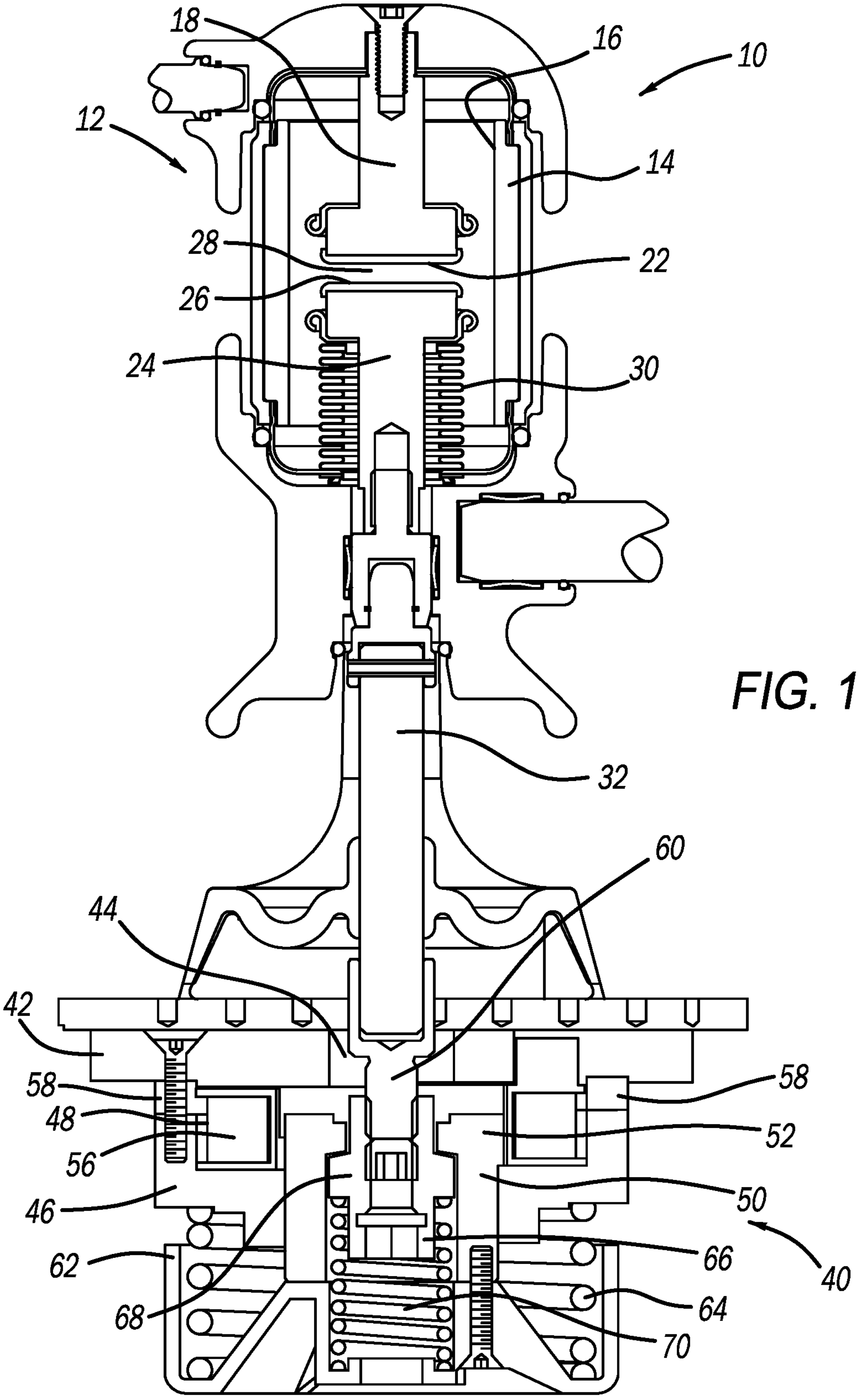
FIG. 1 is a cross-sectional type view of a switching device including a vacuum interrupter and a magnetic actuator.

FIG. 1 is a cross-sectional type view of a switching device 10 intended to represent any switching device suitable for the purposes discussed herein and has application as a switching device associated with a transformer in a residential loop circuit. The switching device 10 includes a vacuum interrupter 12 having a vacuum enclosure 14 defining a vacuum chamber 16, an upper fixed terminal 18 extending through the enclosure 14 and into the chamber 16 and having a contact 22 and a lower movable terminal 24 extending through the enclosure 14 and into the chamber 16 and having a contact 26, where a gap 28 is provided between the contacts 22 and 26 when the vacuum interrupter 12 is open. A bellows 30 allows the movable terminal 24 to move without affecting the vacuum integrity of the chamber 16. The movable terminal 24 is coupled to a drive rod 32.

The switching device 10 also includes an actuator 40 that controls the drive rod 32 through a coupling rod 60 to open and close the vacuum interrupter 12. The actuator 40 includes an annular latching plate 42 having a central opening 44 through which the coupling rod 60 extends. The actuator 40 also includes a stator 46 defining a central opening 48, where a magnetic plunger 50 having a top shoulder 52 is slidably positioned within the opening 48. A coil 56 is positioned against the stator 46 in the opening 48 and a series of permanent magnets 58 are positioned between the plate 42 and the stator 46. A cup member 62 is rigidly secured to the plunger 50 and an opening spring 64 is provided within the cup member 62 and is positioned against the stator 46. A stop member 66 including an annular flange 68 is provided within the plunger 50 and is rigidly attached to the coupling rod 42 through the opening 44 in the plunger 50. A compliance spring 70 is provided within the cup member 62 and is positioned against the flange 68, which pushes the flange 68 against the shoulder 52.

When the vacuum interrupter 12 is to be closed, the coil 56 is energized with current flow in one direction, which draws the plunger 50 and the cup member 62 upward against the bias of the opening spring 64. When the contacts 22 and 26 touch the compliance spring 70 compresses, the cup member 62 continues to move and the flange 68 stops moving so that when the vacuum interrupter 12 is completely closed the compliance spring 70 is more compressed than it was when the contacts 22 and 26 first touched. When fully closed, the plunger 50 is seated against the latching plate 42. The current to the coil 56 is turned off, and the permanent magnets 58 hold the plunger 50 in the closed position. When the vacuum interrupter 12 is to be opened, the coil 56 is energized in the opposite direction, which breaks the magnetic hold of the permanent magnets 58. The opening spring 64 and the compliance spring 70 provide the force to open the contacts 22 and 26 and may be used to help break the welding force on the contacts 22 and 26.

As discussed above, when the contact 26 engages the contact 22 during a closing operation of the vacuum interrupter 12, the contact 26 bounces off of the contact 22, usually twice, before the contacts 22 and 26 are fully engaged. For one common example of vacuum interrupter bounce, the contacts 22 and 26 touch for about 1 ms, then separate for about 2 ms, then touch for about 1 ms, and then separate for about 1 ms before they are fully engaged. At about a 1 mm gap between the contacts 22 and 26 and a typical fault current of 6.3 kA, arcing occurs at a 20 kV instantaneous voltage. It is be desirable to minimize the accumulation of current amp seconds ($I^2T$) of the current wave over time caused by the arcing when the vacuum interrupter 12 is being closed to help prevent contact damage and welding. It is known to initiate a close operation of the vacuum interrupter 12 at a certain point on the voltage wave to achieve certain results based on modeling of the switching device 10 that considers many factors, such as contact bounce characteristics, actuator response time, etc. For one typical controller operational speed, the close operation of the vacuum interrupter 12 can be initiated at sixteen different voltage angles along the voltage wave.

Figure 2:
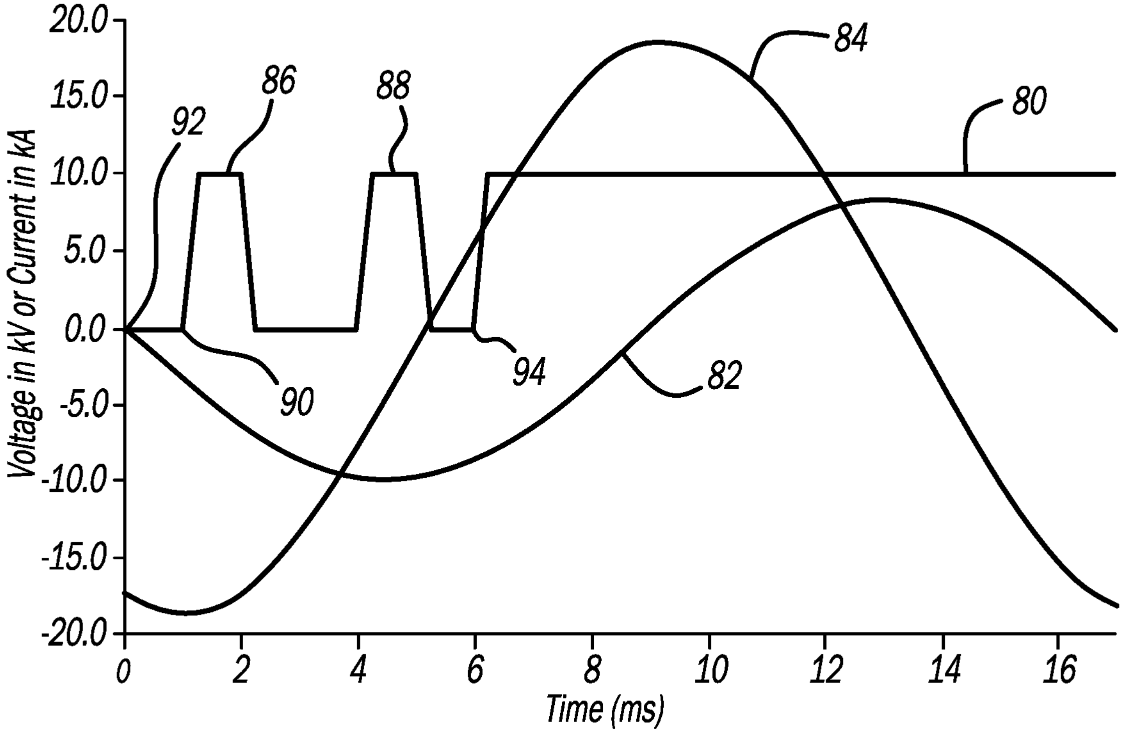
FIG. 2 is a graph with time on the horizontal axis and voltage/current on the vertical axis showing a closing operation of the switching device that generates a symmetrical current wave.

FIG. 2 is a graph with time on the horizontal axis and voltage/current on the vertical axis, where graph line 80 is vacuum interrupter open and close position, where a high signal is the closed position and a low signal is the open position, graph line 82 is the current wave and graph line 84 is the voltage wave. The pulses 86 and 88 show the vacuum interrupter bounce during the closing operation of the vacuum interrupter 12 described above. For this example, the vacuum interrupter 12 is commanded closed at a time so that the first contact between the contacts 22 and 26 at point 90 is at or near a peak, here negative, of the voltage wave and the current wave is near a zero crossing, which provides a symmetrical current wave. For the bounce and fault current of 6.3 kA example given above, the accumulated current $I^2T$ during the time between points 92 and 94 when contact bounce is occurring during the closing operation of the vacuum interrupter 12 is 237 $A^2s$.

Figure 3:
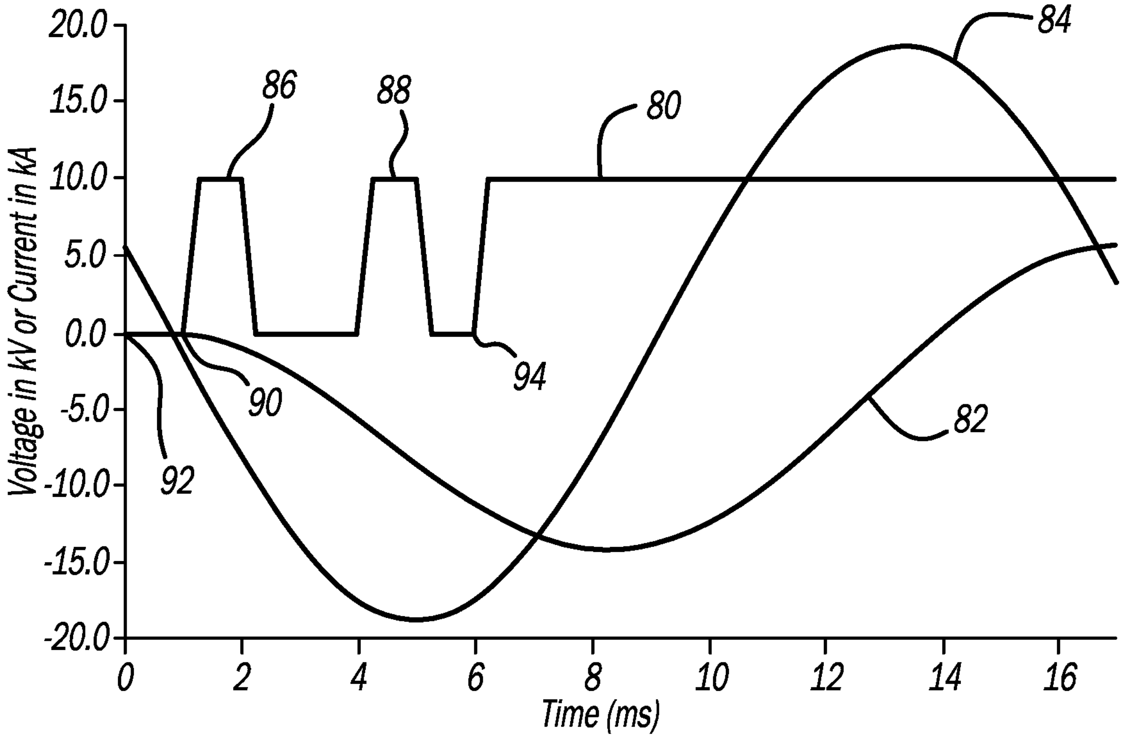
FIG. 3 is a graph with time on the horizontal axis and voltage/current on the vertical axis showing a closing operation of the switching device that generates an asymmetrical current wave.

FIG. 3 is the graph shown in FIG. 2, but where the close initiation point is selected so that the first time the contacts 22 and 26 engage at the point 90, the voltage angle is at or near a zero crossing, which causes an asymmetrical current wave. For the bounce and fault current of 6.3 kA example given above, the accumulated current $I^2T$ during the time between the points 92 and 94 when contact bounce is occurring during the closing operation of the vacuum interrupter 12 is 129 $A^2s$.

Figure 4:
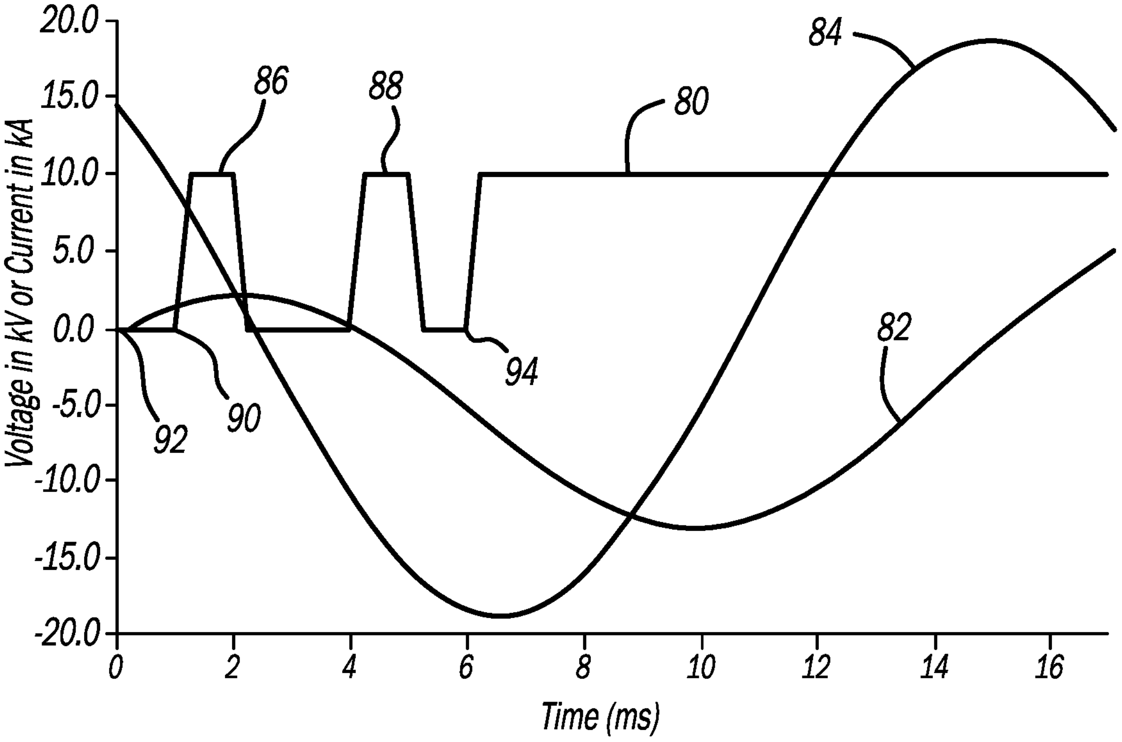
FIG. 4 is a graph with time on the horizontal axis and voltage/current on the vertical axis showing a closing operation of the switching device that generates a minor loop current wave that provides low accumulated current during the closing operation.

This disclosure proposes choosing the voltage angle of when to initiate the closing operation of the vacuum interrupter 12 that minimizes the accumulated current $I^2T$ between the points 92 and 94 when contact bounce is occurring during the closing operation of the vacuum interrupter 12 when fault current is present. FIG. 4 is the graph shown in FIG. 2, but where the close initiation point on the voltage wave 84 is selected so that a minor current loop of the current wave 82 is generated between the points 92 and 94 that minimizes the accumulated current $I^2T$. For the best closing angle and the bounce and fault current of 6.3 kA example given above, the accumulated current $I^2T$ during the time between the points 92 and 94 when contact bounce is occurring during the closing operation of the vacuum interrupter 12 is 24 $A^2s$. This shows that for a given vacuum interrupter bounce, there is a closing angle that results in a much lower accumulated current $I^2T$ than closing at the peak of the voltage to get a symmetrical wave as shown in FIG. 2 or closing at the zero crossing of the voltage wave to get a fully asymmetrical wave as shown in FIG. 3. This result is idealized and does not account for variations in the closing angle and the bounce, but it shows that there is an optimum point that can greatly reduce the accumulated current $I^2T$.

Figure 5:
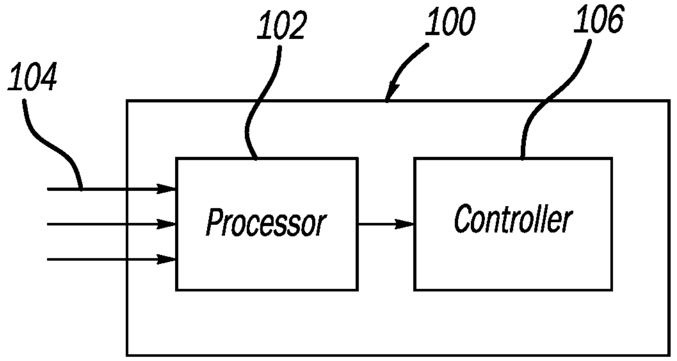
FIG. 5 is a block diagram showing a process for selecting the point on wave closing of the switching device to provide low accumulated current during the closing operation to reduce contact arcing damage.

As mentioned, each voltage angle for initiating the closing operation of the vacuum interrupter 12 produces a different accumulated current $I^2T$ during the closing operation. By experimenting using the various parameters of the particular switching device, the voltage angle closing point that produces the lowest accumulated current $I^2T$ can be identified. The voltage angle closing points that are available would depend on processor speed used in the controller of the switching device. FIG. 5 is a block diagram of a system 100 that illustrates this analysis. The system 100 includes a processor 102 that receives the various parameters on lines 104, such as vacuum interrupter bounce characteristics, actuator response time, fault current, etc., and produces a voltage angle that minimizes the accumulated current $I^2T$, which can then be stored in a controller 106 that controls the switching device.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A method for closing contacts in a switching device during a switching device closing operation, the method comprising:

determining bounce characteristic of the contacts during the closing operation;

identifying available close initiation points on a voltage wave for a voltage across the contacts;

selecting close initiation points from a plurality of possible close initiation points on the voltage wave that minimizes the accumulation of current during the closing operation; and closing the switching device using the selected close initiation point.

2. The method according to claim 1 wherein the selected close initiation points generates a minor current loop of a current wave during the closing operation.

3. The method according to claim 2 wherein the current wave is caused by fault current.

4. The method according to claim 1 wherein the switching device includes a vacuum interrupter that has the contacts.

5. The method according to claim 4 wherein the switching device includes a magnetic actuator that controls the vacuum interrupter.

6. The method according to claim 5 wherein selecting close initiation points includes considering the response time of the magnetic actuator.

7. The method according to claim 5 wherein the switching device is associated with a transformer in an electrical circuit.

8. A method for closing contacts in a vacuum interrupter during a closing operation, the vacuum interrupter being controlled by a magnetic actuator, the method comprising:

determining bounce characteristic of the contacts during the closing operation;

determining a response of the magnetic actuator from the time being commanded closed and closing the contacts;

identifying available close initiation points on a voltage wave for a voltage across the contacts;

selecting one or two of the close initiation points on the voltage wave using the bounce characteristics and the actuator response that minimizes accumulation of current during the closing operation; and closing the vacuum interrupter using the selected close initiation point.

9. The method according to claim 8 wherein the selected one of the close initiation points generates a minor current loop of a current wave during the closing operation.

10. The method according to claim 9 wherein the current wave is caused by fault current.

11. The method according to claim 8 wherein the vacuum interrupter is associated with a transformer in an electrical circuit.

* * * * *